(12) United States Patent
Peters et al.

(10) Patent No.: US 9,702,986 B2
(45) Date of Patent: Jul. 11, 2017

(54) MOISTURE PROTECTION STRUCTURE FOR A DEVICE AND A FABRICATION METHOD THEREOF

(71) Applicant: Teledyne DALSA B.V., Eindhoven (NL)

(72) Inventors: Inge Peters, Eindhoven (NL); Cristian Craus, Helmond (NL)

(73) Assignee: TELEDYNE DALSA B.V., Eindhoven (NL)

( * ) Notice: Subject to any disclaimer, the term of this patent is extended or adjusted under 35 U.S.C. 154(b) by 0 days.

(21) Appl. No.: 14/893,442

(22) PCT Filed: May 24, 2013

(86) PCT No.: PCT/EP2013/060727
§ 371 (c)(1),
(2) Date: Nov. 23, 2015

(87) PCT Pub. No.: WO2014/187502
PCT Pub. Date: Nov. 27, 2014

(65) Prior Publication Data
US 2016/0091615 A1    Mar. 31, 2016

(51) Int. Cl.
*G01T 1/202* (2006.01)
*G01T 1/20* (2006.01)

(52) U.S. Cl.
CPC ............ *G01T 1/2018* (2013.01); *G01T 1/202* (2013.01); *G01T 1/2002* (2013.01)

(58) Field of Classification Search
CPC ...... G01T 1/202; G01T 1/2002; G01T 1/2018
See application file for complete search history.

(56) References Cited

U.S. PATENT DOCUMENTS 7,265,371 B2 *  9/2007  Shoji ..................... B32B 3/00
                                            250/484.4
7,595,493 B2 *  9/2009  Okada .................... G21K 4/00
                                            250/367

(Continued)

FOREIGN PATENT DOCUMENTS

WO    PCT/EP13/060727    11/2014

*Primary Examiner* — David Porta
*Assistant Examiner* — Djura Malevic
(74) *Attorney, Agent, or Firm* — McGuireWoods LLP

(57) ABSTRACT

A moisture protection structure (10) used to protect a device (15) against moisture penetration. The device (15) has a first area (A1) at a first side (S1) for emitting or receiving radiation (RE;RR). The device (15) has a second side (S2) opposite to the first side (S1) attached to a supporting means (20). A lateral side (LS) of the device (15) is defined between a first perimeter delimiting the first area (A1) on the first side (S1) and a second perimeter delimiting a second area (A2) on the second side (S2). The moisture protection structure (10) includes at least one moisture-resistant layer (25) deposited on the first area (A1) and the lateral side (LS) of the device (15) and a moisture-resistant cover (30) arranged to cover the at least one moisture-resistant layer (25) at the first side (S1). The moisture-resistant cover (30) and the at least one moisture-resistant layer (25) are transparent for the emitting or receiving radiation (RE;RR). The moisture protective structure (10) further includes a pressurizing member (55;57;59) attached to the supporting means (20). The pressurizing member (55;57;59) includes an elastic deformable material (40;42) and it is arranged to exert a pressure on the moisture-resistant cover (30) towards the second side (S2) of the device (15). The pressure on the moisture-resistant cover (30) ensures that the first side (S1) of the device (15) is sealed against moisture penetration.

22 Claims, 5 Drawing Sheets

(56) References Cited

U.S. PATENT DOCUMENTS

| | | | | |
|---|---|---|---|---|
| 7,718,974 B2* | 5/2010 | Schulz | G01T 1/20 | 250/370.11 |
| 8,304,735 B2* | 11/2012 | Inoue | G01T 1/2018 | 250/361 R |
| 8,664,607 B2* | 3/2014 | Iwakiri | H01L 27/14632 | 250/361 R |
| 8,735,854 B2* | 5/2014 | Sakai | G01T 1/20 | 250/361 R |
| 9,040,940 B2* | 5/2015 | Itaya | G01V 5/0025 | 250/458.1 |
| 9,054,012 B2* | 6/2015 | Nomura | H01L 27/14685 | |
| 2002/0070351 A1* | 6/2002 | Yanagita | G21K 4/00 | 250/484.4 |
| 2002/0166977 A1* | 11/2002 | Kohda | G03B 42/08 | 250/484.4 |
| 2003/0066311 A1 | 4/2003 | Li | | |
| 2003/0160185 A1* | 8/2003 | Homme | G01T 1/2018 | 250/483.1 |
| 2004/0089813 A1* | 5/2004 | Takabayashi | G01T 1/2018 | 250/370.11 |
| 2004/0124362 A1 | 7/2004 | Hennessy | | |
| 2004/0155320 A1* | 8/2004 | DeJule | G01T 1/2018 | 257/659 |
| 2004/0195514 A1* | 10/2004 | Nagano | G01T 1/2018 | 250/370.11 |
| 2004/0211911 A1* | 10/2004 | Hata | G01T 1/1648 | 250/370.11 |
| 2004/0245474 A1* | 12/2004 | Vieux | G01T 1/20 | 250/370.11 |
| 2005/0040340 A1* | 2/2005 | Morikawa | C09K 11/628 | 250/484.4 |
| 2005/0051735 A1* | 3/2005 | Tazaki | G21K 4/00 | 250/484.4 |
| 2005/0056789 A1* | 3/2005 | Spahn | A61B 6/00 | 250/370.09 |
| 2005/0072931 A1* | 4/2005 | Albagli | G01T 1/2018 | 250/370.11 |
| 2007/0051896 A1* | 3/2007 | Okada | G01T 1/2018 | 250/370.11 |
| 2007/0205371 A1* | 9/2007 | Inoue | G01T 1/2018 | 250/370.11 |
| 2008/0179533 A1* | 7/2008 | Nagata | G01T 1/2002 | 250/370.11 |
| 2008/0308739 A1* | 12/2008 | Sawada | G01T 1/20 | 250/370.11 |
| 2009/0261259 A1 | 10/2009 | Yip | | |
| 2009/0283685 A1* | 11/2009 | Takeda | A61B 6/4233 | 250/370.11 |
| 2010/0001195 A1 | 1/2010 | Konkle | | |
| 2010/0032577 A1* | 2/2010 | Fruehauf | G01T 1/202 | 250/368 |
| 2010/0243908 A1 | 9/2010 | Shoji | | |

* cited by examiner

MOISTURE PROTECTION STRUCTURE FOR A DEVICE AND A FABRICATION METHOD THEREOF

CROSS-REFERENCE TO RELATED APPLICATIONS

This application is the national stage application of and claims priority to International Patent Application No. PCT/EP2013/060727 filed on May 24, 2013, the disclosures of which are incorporated by reference herein in their entirety.

FIELD OF THE INVENTION

The invention relates to a moisture protection structure for a device. The invention also relates to a radiation detector and in particular to a flat panel radiation detector. The invention further relates to a display device including the moisture protection structure and to a method of fabricating the flat panel radiation detector with the moisture protective structure.

BACKGROUND OF THE INVENTION

Radiation detectors are devices capable of detecting incoming radiation. In medicine, radiation detectors for X-ray images have large applications for diagnosis of a patient's condition. The radiation detectors for X-ray images are typically integrated in radiological instruments that utilize computer-processed X-ray images to produce images of specific areas of a patient's body. These images may be planar images, panoramic images or so-called tomographic images. Planar images are typically obtained by flat panel radiation detectors. Panoramic images may be obtained by a sequence of planar images taken one after another. Tomographic images may instead be obtained by a three-dimensional reconstruction of the specific area of the patient's body. The radiological instruments may be intra-oral radiologic dental imagers, dental imagers, computed tomography scanners (CT-scanner), computed axial tomography scanners (CAT-scanners), mobile C-arm, etc. The radiation detectors for X-ray images usually consist of a radiation converter element (e.g. a scintillator) that absorbs and converts the incoming radiation (i.e. X-rays) into converted radiation with longer wavelength (e.g. photons). The converted radiation with longer wavelength reaches a photo sensitive element, e.g. a CMOS photosensor, a CCD image sensor, etc. The photo sensitive element may be coupled to an electronic system that generates electrical signals corresponding to a radiation pattern of the incoming radiation absorbed by the radiation converter element. Data embodied in such electrical signals may be shown in a visual display or sent to a computer for further analysis of the radiation pattern.

The radiation converter element used in the flat panel radiation detectors for X-ray images is usually a CsI (Caesium Iodide) scintillator. In fact CsI scintillators are highly efficient radiation converter elements in the X-ray range. CsI scintillators are capable of absorbing radiation in the X-ray range with high efficiency, preventing that the radiation hits the photo sensitive element, i.e. CsI scintillators have a so called high stopping power. Integration of the CsI scintillator in the flat panel radiation detector requires consideration of a series of factors. Among these factors a lifetime of the flat panel radiation detector ranging between 5 to 10 years must be guaranteed. The CsI scintillator is a part of the flat panel radiation detector most sensitive to lifetime degradation. This is due to the fact that the CsI scintillator is a slightly hygroscopic material, i.e. a material able to attract and hold moisture (i.e. water molecules) from the surrounding environment. Large part of the lifetime degradation of the CaI scintillator depends on penetration of the moisture into the CsI scintillator. The penetration of the moisture into CsI scintillator causes a degradation of a spatial resolution of the CaI scintillator. A measure of this spatial resolution of CsI scintillator is a so-called modulation transfer function (MTF). For high levels of moisture penetrated into the CsI scintillator, the MTF decreases, decreasing also the lifetime of the CsI scintillator. Therefore penetration of moisture into the CaI scintillator and into scintillators in general must be prevented or limited. The regulation of the penetration of moisture is especially relevant in columnar CaI scintillators.

Display devices are other types of devices where the penetration of moisture (i.e. water molecules) must be prevented or limited. Display devices including organic light emitting diodes (OLED) or polymer light emitting diodes (PLED) are particularly sensitive to moisture. These display devices use an electro-luminescence (EL) element in which electric current applied to specific organic luminescent materials transform electricity into luminosity. As duration of use of these display devices increases, the penetration of moisture into the display devices may also increase. The penetration of moisture may cause a detachment between a metal electrode and the organic luminescent material and/or an oxidation of the metal electrode. As a consequence a "dark-spot" in the display device may be formed to which electricity is not supplied. The "dark-spot" may appear as a decrease luminescence or luminescence uniformity of the display device.

Several solutions exist to prevent or limit moisture penetration into radiation detectors for X-ray images or into above-mentioned display devices.

In US20110121185A1a radiation image detecting apparatus is disclosed. The radiation image detecting apparatus is provided with a scintillator panel comprising a phosphor layer on a substrate and a photoelectric conversion panel. The scintillator panel is covered with a moisture protective layer. The scintillator panel is held between the photolelectric conversion panel and an opposed based material. A periphery of the photoelectric conversion panel adheres to a periphery of the opposed based material with an adhesive. Sealing of the scintillator panel is provided with the adhesive with controlled moisture permeability. In a space between the photoelectric conversion panel and the opposed base material a gas with a pressure lower than the atmospheric pressure is provided. The combination of the moisture protective layer of the scintillator panel and of the sealing with the adhesive makes the radiation image detecting apparatus moisture-resistant.

In US20030066311A1 a display element is disclosed. The display element can be used in OLED/PLED. The display element has a luminescent body formed on a glass substrate and a glass cap. The glass substrate and the glass cap are sealed together with a sealing layer of frit. The luminescent body is encapsulated in a structure formed by the glass substrate, the glass cap and the sealing layer of frit. In addition to that, a method to encapsulate the luminescent body is disclosed.

A problem with above-mentioned prior-art is that the radiation image detecting apparatus or display element needs to be sealed or encapsulated in some sort of case or housing to keep the radiation image detecting apparatus or display element moisture-tight.

Another problem with above-mentioned prior-art is that an adhesive or a sealing layer is needed on at least a periphery of the radiation image detecting apparatus or display element to form a tight sealing space surrounding the radiation image detecting apparatus or the display element. The adhesive or the sealing layer needs to be carefully chosen for its moisture permeability. Furthermore the periphery's area over which the adhesive or the sealing layer needs to be applied is significantly large. In addition to that, during temperature variations or temperature cycles used in a fabrication process of the radiation image detecting apparatus or the display element, the adhesive or the sealing layer or the moisture-tight housing may crack if a thermal expansion coefficient of the adhesive or the sealing layer or the moisture-tight housing does not match a thermal expansion coefficient of other materials used for sealing the radiation image detecting apparatus or the display element. Similar temperature variations or temperature cycles may be also obtained during handling (e.g. shipment) and/or storage of the radiation image detecting apparatus or the display element.

SUMMARY OF THE INVENTION

One of the objects of the invention is to at least alleviate the problems of existing moisture protective structures which are used for making a device less vulnerable for moisture penetration. In particular one of the objects of the invention is to at least alleviate the problems of existing moisture protective structures used in a radiation detector and in display devices. According to the invention this object is achieved by a moisture protection structure for a device wherein the device has a first area at a first side for emitting or receiving radiation. The device has a second side opposite to the first side, which second side is attached to a supporting means. The device has a lateral side between a first perimeter delimiting the first area on the first side and a second perimeter delimiting a second area on the second side. The moisture protection structure comprises at least one moisture-resistant layer deposited on the first area and the lateral side of the device, and a moisture-resistant cover arranged to cover the at least one moisture-resistant layer at the first side. The moisture-resistant cover and the at least one moisture-resistant layer are transparent for the radiation. A pressurizing member attached to the supporting means comprises an elastic deformable material. The pressurizing member is arranged for exerting a pressure on the moisture-resistant cover towards the second side for sealing the first side of the device against moisture penetration.

By having a moisture-resistant cover that covers an at least one moisture-resistant layer at a first side of device which is arranged to receive or emit radiation, and by having a pressurizing member with an elastic deformable material that exerts a pressure on the moisture-resistant cover towards a second side opposite to the first side of the device, the moisture-resistant cover adheres to the first side of the device in a way that moisture may not be allowed to penetrate from the first side of the device. Further to that, the at least one moisture-resistant layer protects a lateral side of the device against moisture penetration and further ensures that a contact of the moisture-resistant cover with the device is achieved without gaps and imperfections, thus further improving the sealing at the first side of the device against moisture-penetration. The at least one moisture-resistant layer may have the additional function to flatten an otherwise rough and not flat first area present at the first side of the device that may be in contact with the moisture-resistant cover or may be in contact with an additional moisture-resistant layer. The moisture protective structure in accordance with the invention constitutes a significant improvement over the cited prior-art documents. In fact the mentioned features of the invention are sufficient to protect the device against moisture penetration. US20110121185A1 and US20030066311A1 both disclose encapsulated structures to protect a radiation image detecting apparatus and a display element respectively, against moisture penetration. The invention makes no use of an encapsulated structure but instead uses a pressurizing member with an elastic deformable material which presses the moisture-resistant cover against the first side to protect the first side of the device against moisture penetration.

In some embodiments of the invention, the elastic deformable material used by the pressurizing member may be a foam material or an array of flaps arranged between the moisture-resistant cover and a cover arranged at the first side of the device. The last mentioned cover is attached to the device via a supporting means. The cover as well as the mentioned materials used as elastic deformable materials may completely cover the moisture-resistant cover in order to exert a continuous and uniform pressure on the moisture-resistant cover. This arrangement further improves the sealing of the first side of the device against moisture penetration.

In another example of the invention the pressurizing member, the elastic deformable material and the moisture-resistant cover are arranged in a way to allow a free movement of the moisture-resistant cover in a direction in parallel to the first area of the device. As a consequence the moisture protective structure according to this example of the invention does not need any attachment means used to fixedly attach the moisture-resistant cover to the device. Cited prior-art documents use adhesive to attach and seal the disclosed devices against moisture penetration. By having a moisture-resistant cover that may freely move in a direction in parallel to the first area of the device, cracks in the device or in the moisture protective structure during thermal stress caused by operation and handling of the device or during thermal cycles used to fabricate the device with the moisture protective structure are prevented (or occurring during varying transport and storage conditions). The moisture-resistant cover may freely expand or compress without hampering stiffness of the moisture-resistant structure.

In other embodiments of the invention, the device is a radiation detector and in particular a flat panel radiation detector which includes a scintillator of which a first side receives the radiation and a second side opposite to the first side is coupled to a photosensor. In one embodiment the second side of the scintillator is directly in contact with the photosensor. The photosensor receives a converted receiving radiation from the second side of the scintillator. The radiation detector comprises the moisture protective structure described in previous embodiments of the invention. The scintillator may be a columnar scintillator. The columnar scintillator is a slightly hygroscopic material and as mentioned in the introduction moisture may degrade the performance of the columnar scintillator. By providing the scintillator with the moisture protective structure according to the invention, performance degradation of the columnar scintillator may be limited and lifetime of the scintillator may be extended. Further to that the use of the moisture-resistant cover at the first side of the scintillator ensures that no moisture is allowed to penetrate from the first side of the columnar scintillator. The first side of the columnar scintillator is also the largest side of the scintillator through which moisture may penetrate. As a consequence by sealing the largest side of the columnar scintillator, the requirements on the moisture-resistant layers used at the lateral side of columnar scintillator may be somewhat relaxed. As a further consequence more standardized process may be used to fabricate the moisture protective structure.

According to another aspect of the invention there is provided:

a method of fabricating a flat panel radiation detector, the method comprising the steps of:

coating an optical layer with a scintillator layer to obtain a structure formed by the coated optical layer with the scintillator layer, depositing at least one moisture-resistant layer on a first side of the scintillator layer for receiving radiation and on a lateral side of the coated optical layer with the scintillator layer structure, depositing at least a further moisture-resistant layer on top of the at least one moisture resistant layer at the lateral side of the coated optical layer with the scintillator layer structure, attaching the coated optical layer with the scintillator layer structure to a photosensor on a second side opposite to the first side, sealing the first side with a moisture-resistant cover by means of an elastic deformable material that exerts a pressure on the moisture-resistant cover.

Such a method leads to a flat panel radiation detector which has the earlier mentioned advantages.

BRIEF DESCRIPTION OF THE DRAWINGS

These and other aspects of the invention are apparent from and will be elucidated with reference to the embodiments described hereinafter. In the drawings.

DETAILED EMBODIMENTS

Figure 1A:
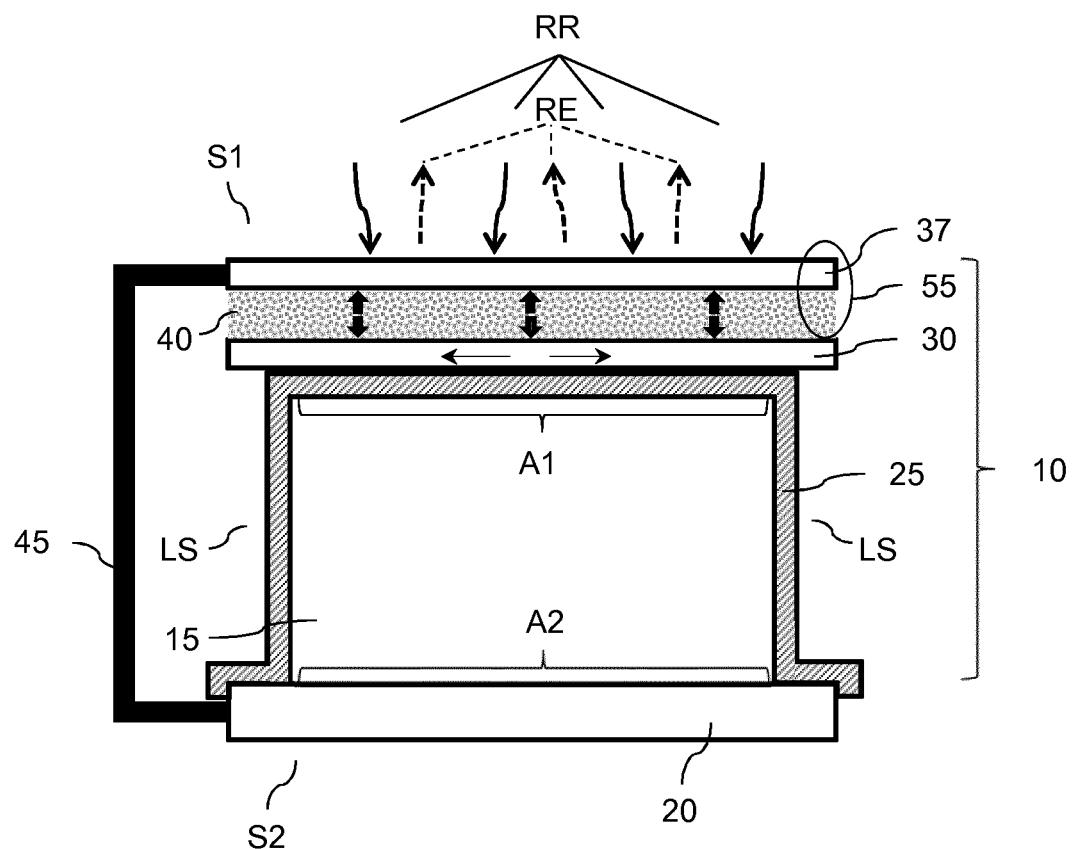
FIG. 1a and FIG. 1b show respectively a cross section and a plane view of an embodiment according to the invention.
Figure 1B:
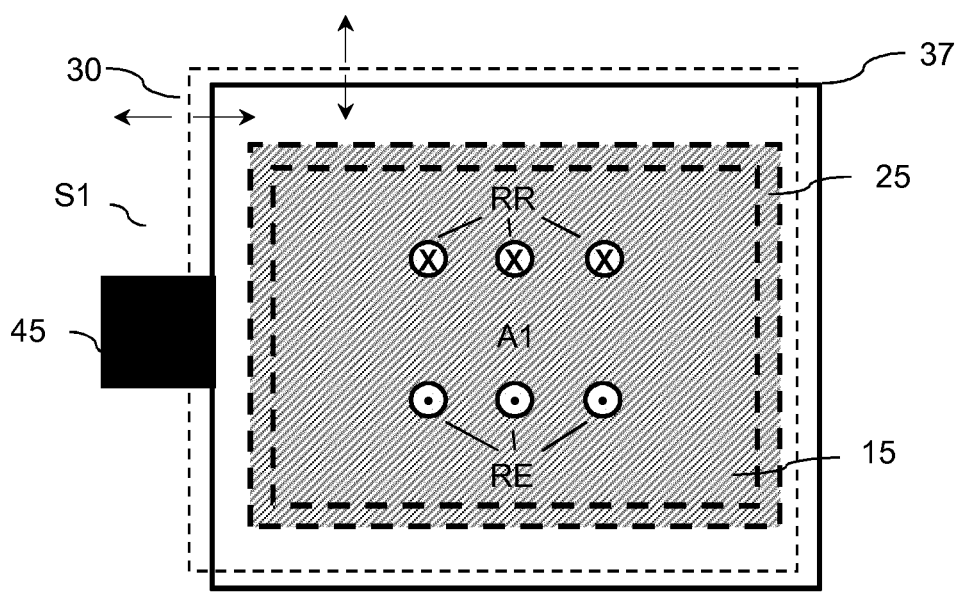

FIG. 1 a shows a cross section of an embodiment according to the invention. FIG. 1b shows a plane view of the embodiment shown in FIG. 1a at a first side S1. Both figures show a moisture protective structure 10 for a device 15 that has a first area A1 at a first side S1 for emitting or receiving radiation RE or RR. In FIG. 1a the emitting radiation RE is indicated by dashed undulated arrows pointing into a direction external to the device 15 and the receiving radiation RE is indicated by solid undulated arrows pointing into a direction towards the first side S1 of the device 15. The device 15 may be for example a display device containing an illumination source used to emit the emitting radiation RE. The illumination source may for example a LED (light emitting diode), OLED (organic light emitting diode), PLED (plastic light emitting diode) or any type of illumination source capable to emit the emitting radiation RE in a desired wavelength of the electromagnetic spectrum. The device 15 may also be a radiation detector used to detect the receiving radiation RE. The device 15 for example may be a radiation detector for visible radiation or a radiation detector for X-ray radiation or any type of radiation detector capable to detect the receiving radiation RE in a desired wavelength range of the electromagnetic spectrum. The radiation detector for example may include more components used to convert the receiving radiation RE of the desired wavelength range of the electromagnetic spectrum into another converted receiving radiation of another wavelength range of the electromagnetic spectrum. The radiation detector may further includes, as it will be further described in another embodiment, a photosensor capable to capture the converted receiving radiation and to convert it into a digital image. The digital image may be further processed in a computer or electronic component that may be or may not be part of the device 15. The device 15 has a lateral side LS defined by a first perimeter delimiting the first area A1 at the first side S1 and a second perimeter delimiting a second area A2 at a second side S2 opposite to the first side S1. In the embodiment of FIG. 1a and FIG. 1b the device 15 has a shape of a parallelepiped in which case the first area A1 is equal to the second area A2, thus also the first perimeter has the same dimension as the second perimeter. Alternatively the device 15 may have any other shape and the first area A1 as well as the first perimeter may be different from respectively the second area A2 and the second perimeter. The device 15 is attached at the second side S2 to a supporting means 20 by means of a rigid structure 45. The supporting means 20 may be attached to a portion of the second area A2 or to the whole second area A2. The supporting means 20 may be a package for the device 15 or alternatively a substrate for the device 15. The moisture protective structure 10 shown in FIG. 1a and FIG. 1b includes at least one moisture-resistant layer 25 deposited on the first area A1 and the lateral side LS of the device 15. The at least one moisture-resistant layer 25 may optionally (not shown in FIG. 1a) be deposited on top of the second area A2 at the bottom of the device 15. The at least one moisture-resistant layer 25 may also extend from the lateral side LS to cover at least a peripheral area of the supporting means 20 extending from the second perimeter of the device 15 as indicated in FIG. 1a. The extension of the at least one moisture-protection layer 25 from the second perimeter of the device 15 which covers a peripheral area of the supporting means 20 may prevent moisture penetration at an edge of the device 15 attached to the supporting means 20. The at least one moisture-resistant layer 25 may preferably be an organic layer like a polymer (e.g. parylene C) that has high conformity to the first area A1 and the lateral side LS of the device 15. The at least one moisture-resistant layer 25 may be used to planarize the otherwise rough first area A1 and lateral side LS of the device 15. The at least one moisture-resistant layer 25 may be an initial moisture protection barrier for the device 15 during the manufacturing process of the moisture protection structure 10. The moisture protective structure 10 also includes a moisture-resistant cover 30, transparent for the emitting radiation ER or the receiving radiation RR and arranged to cover the at least one moisture-resistant layer 25 at the first side S1. The moisture-resistant cover 30 may be for example a plate made of glass or a composite material including glass and carbon fiber or aluminum and carbon fiber. Alternatively the moisture-resistant cover 30 may be a foil made of metal. The moisture-resistant cover may be made of any material that shows low attenuation for the emitting radiation ER or the receiving radiation in order not to affect a luminescence of the emitting radiation ER or a noise level of the receiving radiation RR. The moisture protective structure 10 further includes a pressurizing member 55 attached to the supporting means 20. The pressurizing member 55 includes an elastic deformable material 40 and it is arranged to exert a pressure to the moisture-resistant cover 30 in a direction towards the second side S2. The pressurizing member 55 is used to seal the first side S1 of the device 15 against moisture penetration. The pressure on the moisture-resistant cover 30 ensures that the moisture-resistant cover 30 adheres to a surface of the at least one moisture-resistant layer 25 at the first side S1 without leaving gaps through which moisture may penetrate. The surface of the at least one moisture-resistant layer 25 at the first side S1 as well as a surface of the moisture-resistant cover 30 in contact with the at least one moisture-resistant layer 25 may be flat and clean of imperfections, thus further preventing formations of gaps through which moisture may penetrate. In the embodiment of FIG. 1a and FIG. 1b the pressurizing member 55 further comprises a further cover 37 at the first side S1 that is attached to the supporting means 20 by means of a rigid structure 45. FIG. 1a and FIG. 1b show that the further cover 37 is arranged to cover completely the moisture-resistant cover 30 in order to exert a continuous and uniform pressure on the moisture-resistant cover 30. The further cover 37 is fixedly attached to the supporting means 20 by means of the rigid structure 45 only by one side of the further cover 37 at the lateral side LS. Alternatively the further cover 37 may be attached to the supporting means 20 by means of a plurality of rigid structures from any other one or more of the sides (top, bottom or lateral) of the further cover 37. By having a further cover 37 that covers the moisture-resistant cover 30 for at least a surface corresponding to an area formed by the at the least one moisture-resistant layer 25 deposited on the first area Al of the device 15 and by having the elastic deformable material 40 between said further cover 37 and the moisture-resistant cover 30, a uniform and constant pressure is exerted on the moisture-resistant cover 30. This embodiment provides a moisture protective structure 10 for the device 15 that may eliminate gaps through which moisture may penetrate at an interface between the at least one moisture-resistant layer 25 and the moisture-resistant cover 30. In this embodiment the elastic deformable material 40 may include for example foam, silicone, an array of flaps or any type of material that in contact with both the further cover 37 and the moisture-resistant cover 30 expands, thereby exerting a pressure on both the further cover 37 and on the moisture-resistant cover 30. In fact since the further cover 37 is fixedly attached to the supporting means 20 by means of the rigid structure 45 to which the device 15 is also attached, the elastic deformable material 40 remains somewhat compressed between the further cover 37 and the moisture-resistant cover 30 thereby exerting a pressure on the moisture-resistant cover 30 towards the second side S2 equal but opposite to a pressure exerted to the further cover 37 towards the first side S1. This pressure is schematically indicated in FIG. 1a with two double arrowed thick lines between the further cover 37 and the moisture-resistant cover 30. In the embodiment of FIG. 1a and FIG. 1b it is further schematically indicated with thin arrows in opposite directions that the pressurizing member 55, the elastic deformable material 40 and the moisture-resistant cover 30 are arranged with respect to each other to allow the moisture-resistant cover 30 to move freely in a direction parallel to the first area A1 of the device 15. In other words the moisture-resistant cover 30 is not fixedly attached to the device 15 or the supporting means 20. The moisture-resistant cover 30 is kept in place exclusively by the pressure exerted by the elastic deformable material 40. This has the advantage that no adhesive or other types of sealant material are needed to attach the moisture-resistant cover 30 to the device 15. As a consequence, during temperature variations or temperature cycles used during a fabrication process of the device 15 or obtained during handling (e.g. shipment) or storage of the device 15, the moisture-resistant cover 30 may expand or compress in a direction parallel to the first area A1 without damaging the device 15 or the moisture-resistant structure 10 by for example a cracking of the adhesive or other types of sealant material. Further to this the moisture-resistant cover 30 may also expand or compress in a direction perpendicular to the first area A1 in which case an amount of expansion or compression of the moisture-resistant cover 30 may be determined by a thermal behavior of the type of material used in the elastic deformable material 40 and of the type of material used in the moisture-resistant cover 30.

Figure 2A:
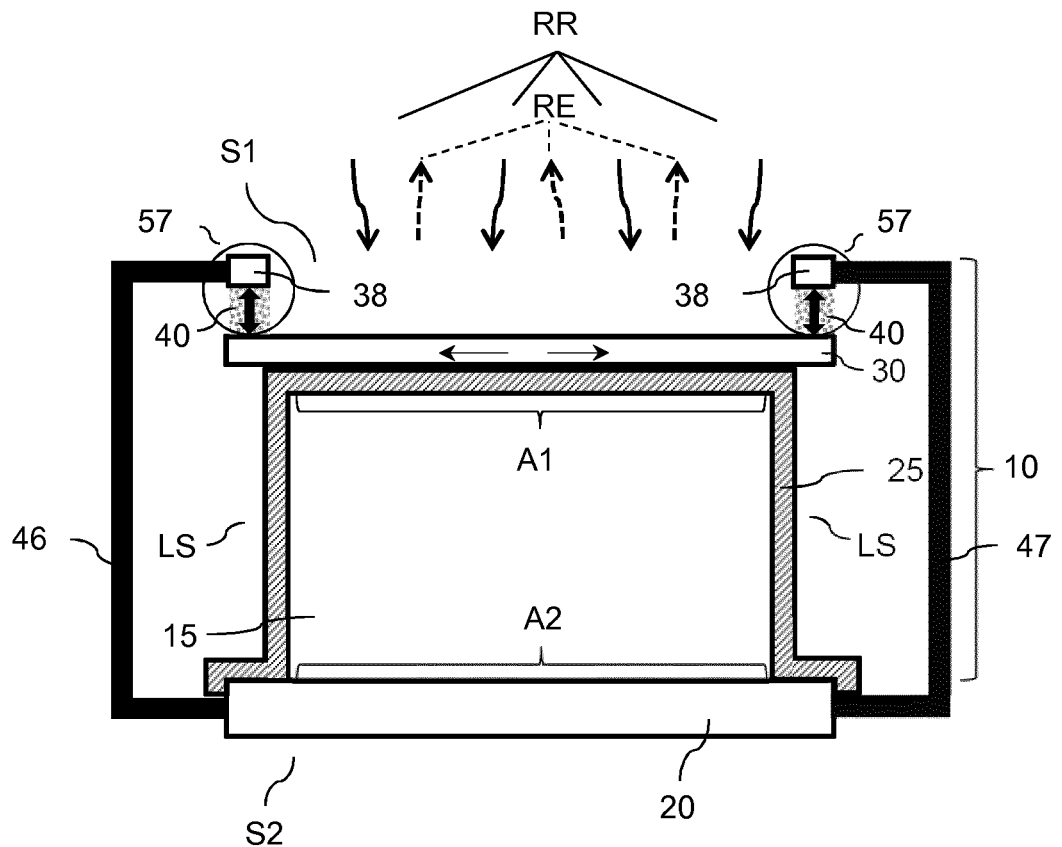
FIG. 2a and FIG. 2b show respectively a cross section and a plane view of an another embodiment according to the invention.
Figure 2B:
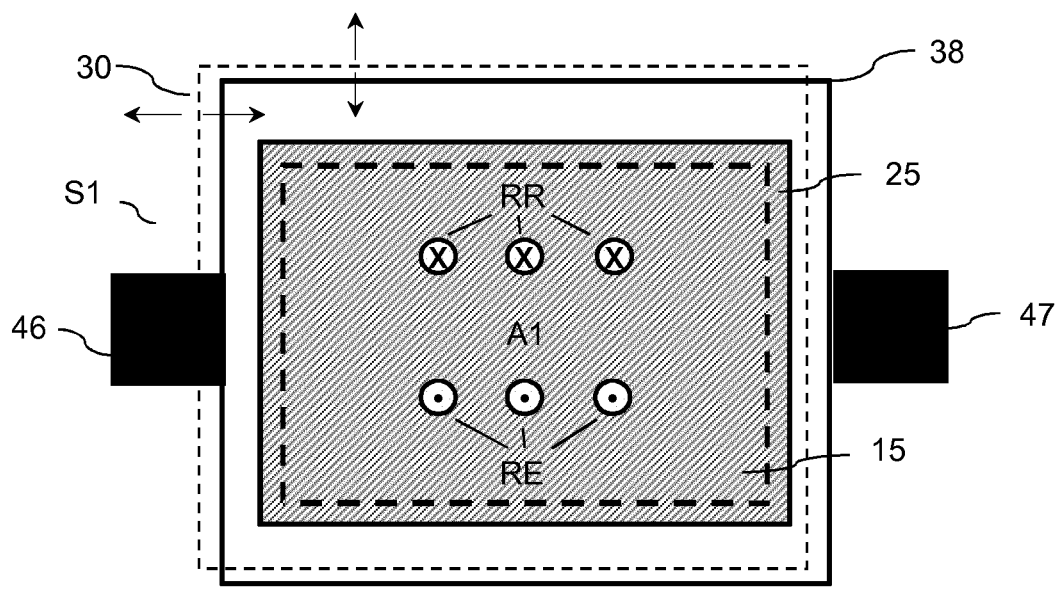

FIG. 2a and FIG. 2b show respectively a cross section and a planar view of another embodiment according to the invention. This embodiment is similar to the embodiment shown in FIG. 1a and FIG. 1b with a difference that the further cover 38 is arranged to cover only a periphery along a perimeter of the moisture-resistant cover 30. Alternatively the further cover 38 may consist of a plurality of separated pieces where each one of the separated pieces may cover a portion of the moisture-resistant cover 30. Each one of the separated pieces may be attached to the supporting means 20. FIG. 2a also shows that the further cover 38 is attached via two lateral sides of the further cover 38 to two lateral sides of the supporting means 20 at the lateral side LS of the device 15 by means of two rigid structures 46 and 47. Alternatively the further cover 38 may be attached from any one of its top, bottom or lateral sides or from a plurality of its top, bottom or lateral sides to any one of the sides of the supporting means 20. In the embodiment of FIG. 2a and FIG. 2b the elastic deformable material 40 is arranged between the further cover 38 and the moisture-resistant cover 30 at the periphery along the perimeter of the moisture-resistant cover 30. In this particular embodiment the further cover 38 and the elastic deformable material 40 do not need to be transparent to the emitting or receiving radiation ER or RR.

Figure 3A:
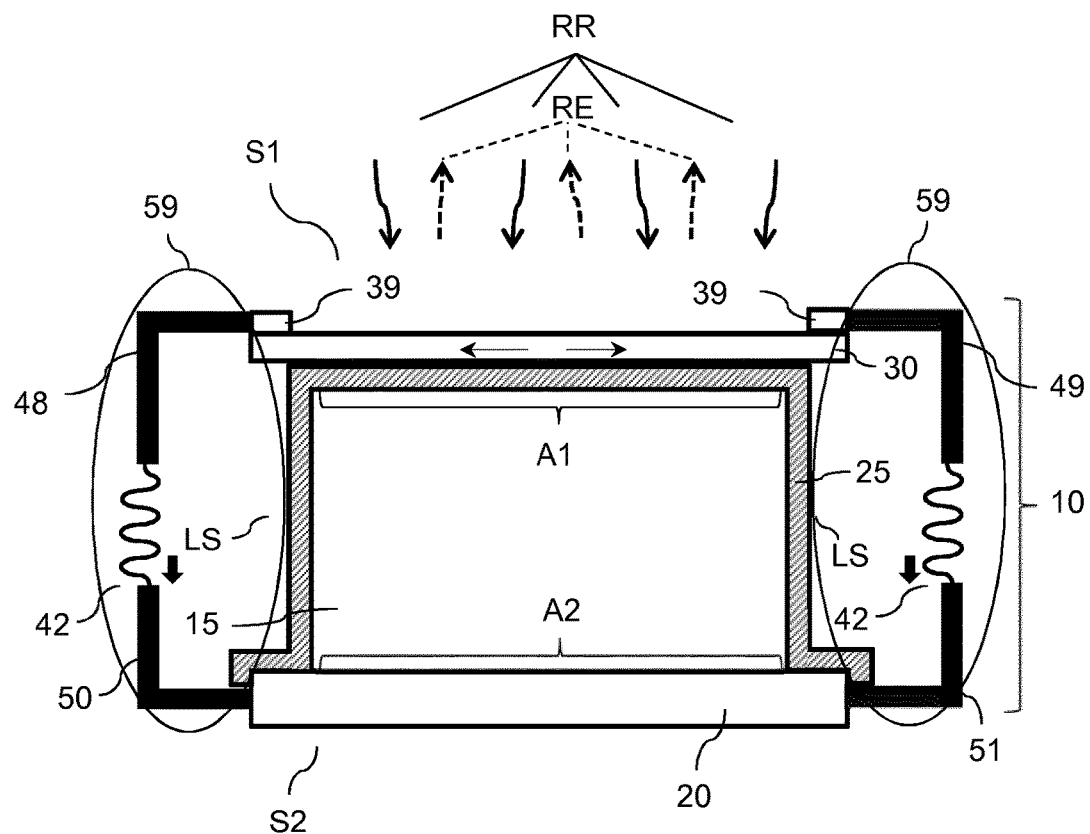
FIG. 3a and FIG. 3b show respectively a cross section and a plane view of an alternative embodiment according to the invention.
Figure 3B:
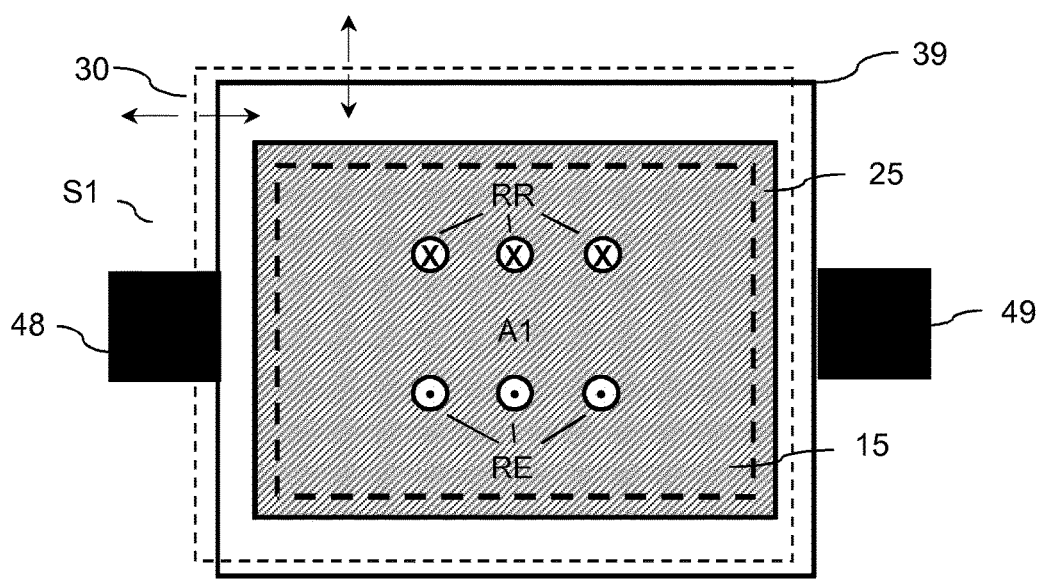

FIG. 3a and FIG. 3b show respectively a cross section and a planar view of another alternative embodiment according to the invention. In this embodiment a different pressurizing member 59 is used. The pressurizing member 59 includes a further supporting means 39 which is attached to the moisture-resistant cover 30 or in contact with the moisture-resistant cover 30 in at least in a periphery of the moisture-resistant cover 30. The further supporting means 39 is attached to the supporting means 20 of the device by means of an elastic deformable material 42 via rigid structures 48, 49, 50 and 51. The elastic deformable material 42 may be for example a spring or any type of elastic deformable material capable to exert a pressure to the moisture-resistant cover 30 towards the second side S2 (as indicated in FIG. 3a by the thick arrows pointing towards the second side S2). The supporting means 39 may also completely cover the moisture-resistant cover 30. In this case a more uniform and constant pressure is exerted on the moisture-resistant cover 30.

Figure 4A:
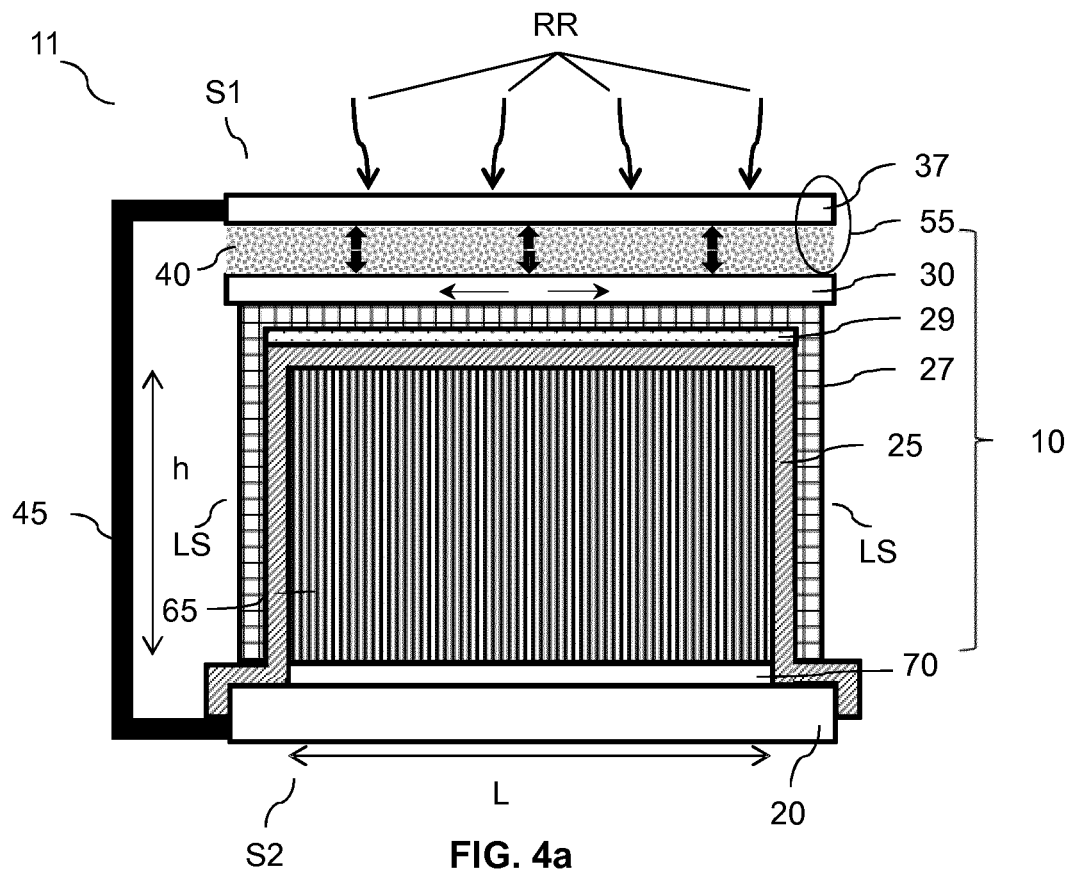
FIG. 4a and FIG. 4b show respectively a cross section and a plane view of a radiation detector according to the invention.
Figure 4B:
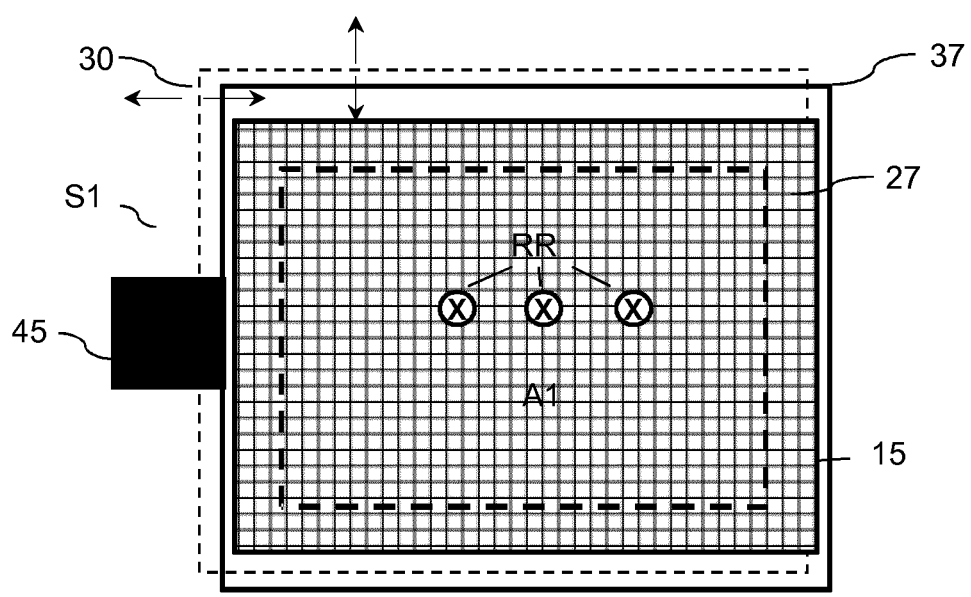

FIG. 4a and FIG. 4b show respectively a cross section and a plane view of a radiation detector 11 according to the invention. The radiation detector 11 may be a flat panel radiation detector which may be used for planar imaging as mentioned in the introduction. The radiation detector 11 includes a scintillator having a first side and a second side opposite to the first side. The first side of the scintillator 65 is arranged at the first area A1 of the device 15 to receive the receiving radiation RR. In an alternative arrangement (not shown in FIG. 4a) an optional substrate layer may be arranged on top of the scintillator 65 at the first side S1 of the device 15. In this alternative arrangement a first side of the optional substrate layer is arranged at the first side S1 of the device 15 and a second side of the optional substrate layer opposite to the first side is in contact with the scintillator 65. The substrate layer may be a layer transparent to the radiation as for example an aluminum or an amorphous carbon layer. The radiation detector 11 further includes a photosensor 70 coupled to the second side of the scintillator 65 to receive a converted receiving radiation from the scintillator 65. The photosensor 70 may be attached at the second side S2 of the device 15 to the supporting means 20. The photosensor 70 may be in contact with the second side of the scintillator 65. The scintillator 65 converts the receiving radiation RR (e.g. X-ray radiation) into converted receiving radiation (e.g. photon). The photosensor 70 receives the converted receiving radiation and translates the converted receiving radiation into an image that may be further processed or displayed. An at least one moisture-resistant layer 25 is deposited on the first side S1 of the scintillator 65 and on the lateral side LS of the device 15 that includes the scintillator 65. In the case where the substrate layer is arranged on top of the scintillator 65, the at least one moisture-resistant layer 25 may be deposited on the first side S1 of the substrate layer and on the lateral side LS of the device 15 that includes the scintillator 65 with on top the substrate layer. The at least one moisture-resistant layer 25 may be deposited on top of the second area A2 of the device 15 which corresponds to the area of the photosensor 70 attached to the supporting means 20. Alternatively the at least one moisture-resistant layer 25 may be deposited on the second side of the scintillator 65 with which the scintillator 65 is in contact with the photosensor 70. The at least one moisture-resistant layer 25 may extend from the lateral side LS to cover a peripheral area of the supporting means 20 which extends from the second perimeter of the device 15. The device 15 may be arranged such that the scintillator 65 may be in direct contact with the photosensor 70. An optional reflective layer 29 is deposited on top of the at the least one moisture-resistant layer 25 to reflect the portion of converted receiving radiation that has not been absorbed by the scintillator 65 and has not been received by the photosensor 70 back into the scintillator 65. The reflective layer 29 may improve a conversion efficiency of the receiving radiation RR into converted receiving radiation. The reflective layer 29 may be made of a thin metal layer such as an aluminum film, silver film, etc. On top of the at least one moisture-resistant layer 25 at the lateral side LS and on top of the reflective layer 29 at the first side S1, at least a further moisture-resistant layer 27 is deposited. The at least a further moisture-resistant layer 27 may also be deposited only on the lateral side LS of the device 15 that includes the scintillator 65. The at least a further moisture-resistant layer 27 may be a pair of an inorganic layer and an organic layer. Alternatively the at least a further moisture resistant layer 27 may be a stack of pairs of the inorganic/organic layers. The inorganic layer (e.g. parylene) may have a thickness in a range of 2-20 um. The organic layer (e.g. $Si_3N_4$) may have typically a thickness of 100 nm. The mentioned reflective layer 29 may be alternatively placed on top of the at least a further moisture-resistant layer 27. The reflective layer 29 should be placed in proximity of the top of the scintillator 65, say within 50 um. For a larger distance than approximately 50 um, the spatial resolution of the radiation detector 11 may be reduced. The moisture-resistant cover 30, the pressurizing member 55 with the further cover 37 already described in the embodiment of FIG. 1a and FIG. 1b are provided on top of the at least a further moisture-resistant layer 27 at the first side S1. Alternatively the at least a further moisture-resistant layer 27 may be provided partially on top of the at least one moisture-resistant layer 25 on top of the scintillator 65 in which case the pressurizing member 55 and the cover 30 are directly placed on top of the at least one moisture-resistant layer 25. It should be noted that in case the scintillator 65 or the scintillator 65 with on top the substrate layer is in direct contact or in contact by means of the at least one moisture-resistant layer 25 with the photosensor 70, the pressurizing member 55 together with the cover 30 provide pressure on top of the scintillator 65 or on top of the substrate layer arranged on top of the scintillator 65 to maintain the scintillator 65 in contact with the photosensor 70 at the second side of the scintillator 65. The scintillator 65 may be a columnar scintillator. The columnar scintillator 65 consists of crystal columns of average diameters as small as a few microns. When the crystal columns of the columnar scintillator 65 are spatially separated such that the converted receiving radiation is confined in the crystal columns, the columnar scintillator 65 is said to have a high spatial resolution, provided that the average diameter of the crystal column is as small as a few microns. In high spatial resolution columnar scintillators distance between the crystal columns is negligible compared to the average diameter of the crystal column. The distance between the crystal columns may be more than 1000 times smaller than the average diameter of the crystal columns. Besides that, also a length of the crystal columns (i.e. a thickness of the columnar scintillator 65) affects the spatial resolution. When moisture penetrates into the columnar scintillator 65, the crystal columns become larger. The amount of enlargement of the crystal column depends on the amount of moisture penetrating per unit area of the columnar scintillator 65. For high spatial resolution columnar scintillators, the moisture that penetrates into the columnar scintillator 65 distributes almost uniformly in the columnar scintillator 65. The moisture that penetrates into the columnar scintillator 65 does not depend anymore on through which area the moisture penetrates into the columnar scintillator 65. As a consequence for high spatial resolution columnar scintillators, the moisture protective structure 10 may be optimized by carefully choosing the at least one moisture-resistant layer 25, the further moisture-resistant layer 27 and the moisture-resistant cover 30. In other words instead of only applying high quality moisture-resistant layers to the columnar scintillator 65, i.e. the at least one moisture resistant layer 25 and the at least a further moisture-resistant layer 27 both with high quality moisture-resistance requirements, it is possible to reduce the quality requirements of said layers by minimizing moisture penetration into the first side of the columnar scintillator 65 by using the moisture-resistant cover 30. High quality moisture-resistant layers are in fact obtained under very well controlled manufacturing conditions and require specific production environments in terms of cleanroom standards and preparation procedures to establish a low particle count for by-products obtained during a deposition of the high quality moisture-resistant layers. On the contrary standard-quality moisture-resistant layers may be obtained under standard conditions and at cheaper production environments. A measure of a passage of water (or moisture) through a substance is a so-called water vapor transmission rate (WVTR). High quality moisture-resistant layers need to have a very low water vapor transmission rate and preferably in the order of $10^{-5}$ g/m²/day. Depending on an expected lifetime of the columnar scintillator 65, a maximum allowable performance degradation of the columnar scintillator 65 is determined. As described in the introduction, a MTF (Modulation Transfer Function) is a measure of the performance of the columnar scintillator 65. The MTF degrades with moisture penetration. For a maximum allowable performance degradation of the columnar scintillator 65 there is a corresponding minimum allowed modulation transfer function $MTF_{min}$. For a corresponding minimum allowed modulation transfer function $MTF_{min}$ there is a corresponding maximum mass of water (or moisture) $m_{max}$ that may allow to penetrate into the columnar scintillator 65 and causing the maximum allowable performance degradation of the columnar scintillator 65. $m_{max}$ is linked to the water vapor transmission rate with the following relation:

$$m_{max} = WVTR_{max} * A * t, \quad (1)$$

where A is the area through which the moisture penetrates into the columnar scintillator 65 and t is a target lifetime of the columnar scintillator 65. For the above-mentioned columnar scintillators in which the moisture that penetrates into the columnar scintillator 65 distributes almost uniformly in the columnar scintillator 65, $m_{max}$ depends only marginally on through which area the moisture penetrates. This means that a composite moisture protective structure as the moisture protective structure 10 described in FIG. 4a may be used. In this moisture protective structure 10 the moisture-resistant cover 30 made of a material with a given $WVTR_a$ is used to protect the first side of the columnar scintillator 65 and the at least a further moisture-resistant layer 27 in combination with the at the least one moisture-resistant layer 25 made of a different materials with a different given $WVTR_b$ is used to protect against moisture penetration the lateral side LS of the device 15 that includes the columnar scintillator 65. As an example we assume that the columnar scintillator 65 of FIG. 4a is a square columnar scintillator of side L and height h. In a first case we also assume an hypothetical moisture protective structure in which there is no moisture-resistant cover 30. The hypothetical moisture protective structure is formed only by a combination of the at least one moisture-resistant layer 25 with the at least a further moisture-resistant layer 27. This hypothetical moisture protective structure has a water vapor transmission rate of $WVTR_1$. In this hypothetical moisture protective structure a maximum allowed mass of water $m_{max1}$ that enters into the columnar scintillator 65 and causes a minimum allowed performance $MTF_{min1}$ of the columnar scintillator is given by:

$$m_{max1} = WVTR_1 * L^2 * t. \quad (2)$$

Typical values for L and h for columnar scintillators used in C-arms applications are respectively 0.2-0.35 m and 600 um. In a second case we assume to use the moisture protective structure 10 formed by the combination of the at least one moisture-resistant layer 25 with the at least a further moisture-resistant layer 27 and with the moisture-resistant cover 30 on top of the columnar scintillator 65. In this second case however the combination of the at least one moisture-resistant layer 25 with the at least a further moisture-resistant layer 27 has a different water vapor transmission rate $WVTR_2$. In this second case the maximum allowed mass of water $m_{max2}$ that enters the columnar scintillator 65 and causes a minimum allowed performance $MTF_{min2}$ of the columnar scintillator 65 is given by:

$$m_{max2} = WVTR_2 * 4 * h * L * t \quad (3)$$

In relation (3) we assume that the moisture-resistant cover 30 is a perfect sealing for the first side of the columnar scintillator 65 against moisture penetration with negligible water vapor transmission rate. If we want to achieve in the first and second cases the same minimum allowed performances of the columnar scintillator 65, it must be then:

$$m_{max1} = m_{max2} \Leftrightarrow WVTR_1 * L^2 * t = WVTR_2 * 4 * h * L * t. \quad (4)$$

In the first case $WVTR_1$ must be very low (as said in the order $10^{-5}$ g/m²/day) because a high quality combination of the at least one moisture-resistant layer 25 with the at least a further moisture-resistant layer 27 must be used. In the second case a standard quality combination of the at least one moisture-resistant layer 25 with the at least a further moisture-resistant layer 27 may be used with a water vapor transmission rate as large as $$WVTR_2 = (L/4*h) \, WVTR_1. \quad (5)$$

For the typical values of L and h used in C-arms applications, $WVTR_2$ may be between circa 83 to 143 times larger than $WVTR_1$. It should be noted in both the first and second cases that typically the at least one moisture-resistant layer 25 is an organic layer with limited moisture-resistant characteristics while the at least a further moisture-resistant layer 27 is a pair or a stack of pairs of inorganic/organic layers. In this case the mentioned $WVTR_1$ and $WVTR_2$ may be determined mainly by the moisture-resistant characteristics of only the at least a further moisture-resistant layer 27. In order to determine a number of pairs of inorganic/organic layers necessary at the lateral side LS of the columnar scintillator 65 to achieve the desired $WVTR_2$ for a given lifetime of the columnar scintillator 65, it may be necessary to calculate the contribution in terms of water vapor transmission rate of each individual layer of the stack of pairs. The water vapor transmission rate for each of the moisture-resistant layers may be estimated with a method well known in the art, by calculating a moisture penetration through defects of each of the moisture-resistant layers. These defects are holes through which moisture may penetrate and are called in the art pinholes. The water vapor transmission rate for each of the moisture-resistant layers depends on a pinhole size, i.e. a radius of the pinhole, a density of the pinholes of each of the moisture-resistant layers and on a thickness of a wall formed by each of the moisture-resistant layers deposited on each other. As an example, an inorganic $Si_3N_4$ moisture-resistant layer may have a pinhole radius of 0.5-2 um and a pinholes density of 100-2000 pinholes per cm² depending on a deposition condition and on a preventive method used to control the pinholes density. Based on these considerations, the water vapor transmission rate for each of the moisture-resistant layers as well as the number of moisture-resistant layers necessary at the lateral side LS of the columnar scintillator 65 to achieve the desired $WVTR_2$, may be determined in such a way that: $WVTR_2 = N \, WVTR_i$, where N is the number of moisture-resistant layers necessary at the lateral side LS of the device 15 that includes the columnar scintillator 65 and $WVTR_i$ is the water vapor transmission rate of each of the moisture-resistant layers. In this latest example the at least one moisture-resistant layer 25 may be for example composed of a plurality of organic layers and the at least a further moisture-resistant layer 27 may be for example composed of a plurality of inorganic layers.

Figure 5A:
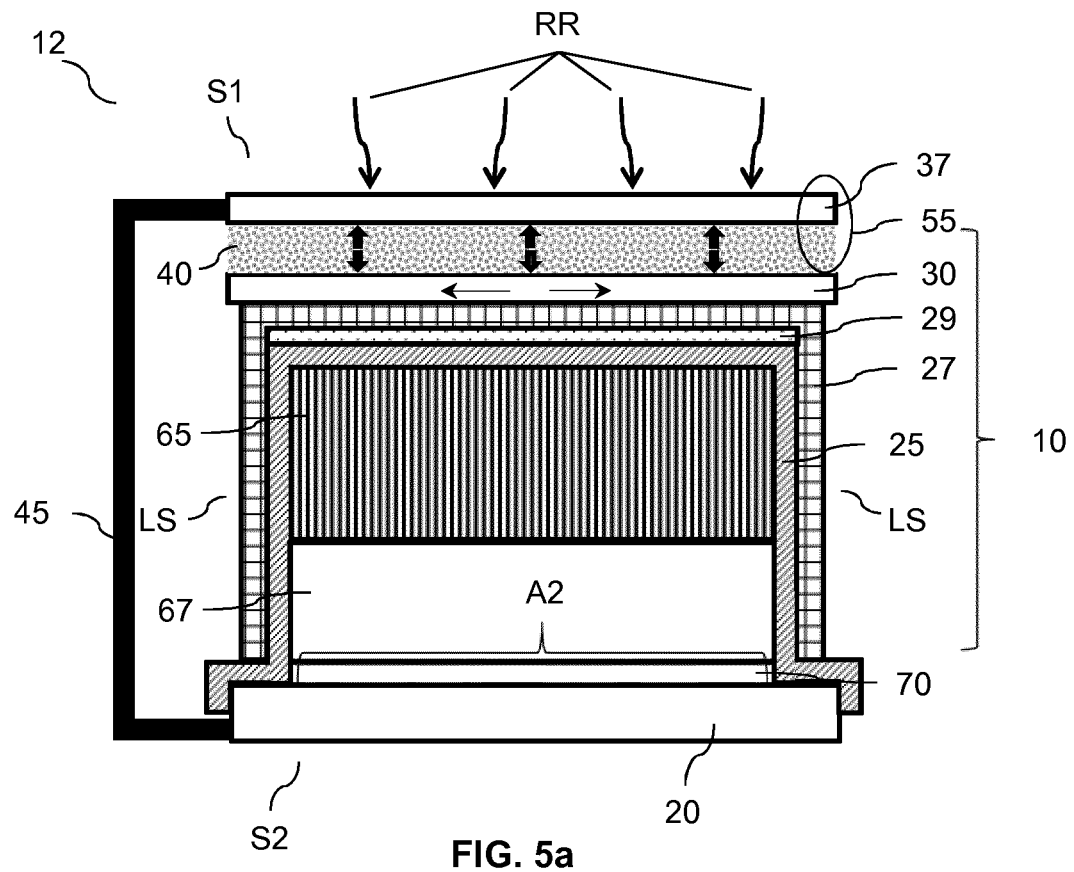
FIG. 5a and FIG. 5b show respectively a cross section and a plane view of another radiation detector according to the invention It should be noted that items which have the same reference numbers in different Figures, have the same structural features and the same functions, or are the same signals. Where the function and/or structure of such an item has been explained, there is no necessity for repeated explanation thereof in the detailed description.
Figure 5B:
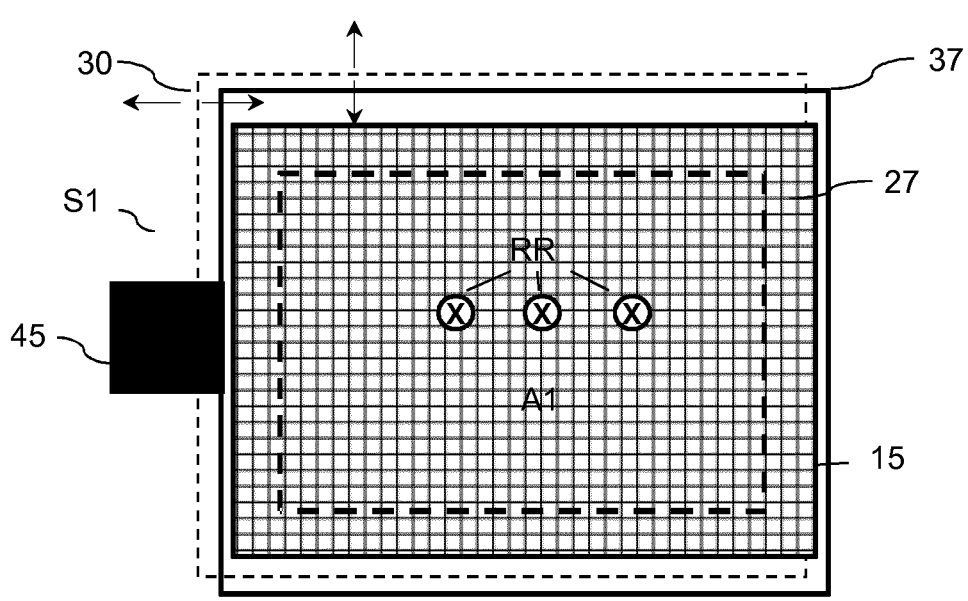

FIG. 5a and FIG. 5b show respectively a cross section and a plane view of another radiation detector 12 according to the invention. The radiation detector 12 may be a flat panel radiation detector. This embodiment is similar to the embodiment shown in FIG. 4a and FIG. 4b with the difference that an optical layer 67 is arranged between the photosensor 70 and the scintillator 65. The optical layer 67 optically couples the photosensor 70 with the scintillator 65. The optical layer 67 may be a fiber optical plate between the photosensor 70 and the scintillator 65. The radiation detector 12 may receive high dose of radiation during its lifetime and it should withstand that high dose of radiation. The optical layer 67 may be used to protect the photosensor 70 from the portion of the high dose of radiation that is not stopped by the scintillator 65. In this case the at least one moisture-resistant layer 25 and the further moisture-resistant layer 27 of the moisture protective structure 10 are extended at the lateral side LS of the device 15 that includes the optical layer 67 to prevent or limit moisture penetration from the lateral side LS also at the side of the optical layer 67.

The radiation detector 12 presented in FIG. 5a and FIG. 5b may be fabricated with a fabrication method including the following fabrication steps. In a first step an optical layer 67 is coated with a scintillator layer. The scintillator layer may be the scintillator 65 depicted in FIG. 4a and FIG. 5a. The optical layer 67 may be a fiber optical layer 65 and the scintillator layer 65 may be a CaI:Ti scintillator layer 65. An at least one moisture-resistant layer 25 is deposited on a structure formed by the optical layer 67 coated with the scintillator layer 65. The at least one moisture-resistant layer 25 may be a temporary moisture barrier as already described in the moisture protective structure 10 of FIG. 1a and FIG. 1b. On top of the at least one moisture-resistant layer 25, an at least a further moisture-resistant layer 27 is deposited on the lateral side LS of the structure formed by the optical layer 67 coated with the scintillator layer 65. Optionally, when for example a transmittance in the UV (Ultra Violet) range of the electromagnetic spectrum of the at least a further moisture-resistant layer 27 is more than 20%, the at least a further moisture-resistant layer 27 may be also deposited on top of the at least one moisture-resistant layer 25 on the first side S1. The at least a further moisture-resistant layer 27 may be a $Si_3N_4$ film deposited by plasma enhanced chemical vapor deposition (PECVD). Depending on the scintillator layer 65 size and thickness and on the radius of the pinholes and density of the pinholes of the chosen at least a further moisture-resistant layer 27, more than one at least a further moisture-resistant layer 27 may be deposited on the lateral side LS or optionally also on the first side S1 of the structure formed by the optical layer 67 coated with the scintillator layer 65. After depositing the at least a further moisture-resistant layer 27, the structure formed by the optical layer 67 coated with the scintillator layer 65 is attached to the photosensor 70 by means of an intermediate layer of controlled thickness. The controlled thickness of this layer should be such not to decrease the spatial resolution of the scintillator layer 65. For a scintillator layer 65 used in C arms the MTF at 1 lp/mm (1 line pair per millimeter, i.e. a measure of the scintillator resolution quantifying how close lines may be close to each other and still visibly resolved) may be typically 55%. After attaching the structure formed by the optical layer 67 coated with the scintillator layer 65 to the photosensor 70, the first side of the scintillator layer 65 is sealed with a moisture-resistant cover 30. An elastic deformable material 40, 42 exerts a pressure to the moisture-resistant cover 30 to seal the first side of the scintillator layer against moisture penetration, as described in the examples given in FIG. 1a to 5b. Optionally a UV curable adhesive may be used to attach the structure formed by the optical layer 67 coated with the scintillator layer 65 to the photosensor 70. In such situation before attaching the structure formed by the optical layer 67 coated with the scintillator layer 65 to the photosensor 70, the second side of the structure formed by the optical layer 67 coated with the scintillator layer 65 may be prepared to be in contact with the UV adhesive. Preparation may consist of cleaning or applying promoters to the second side of the structure. After preparation of the second side of the structure, the UV adhesive may be applied taking care that no air bubbles are trapped during the application of the UV adhesive. The application of the UV adhesive may be performed under vacuum conditions. After applying the UV adhesive, UV light may be applied to the UV adhesive to cure the UV adhesive.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A radiation detector comprising a moisture protection structure the radiation detector having
   a first area at a first side for receiving radiation,
   a second side opposite to the first side attached to a supporting means, and
   a lateral side between a first perimeter delimiting the first area on the first side and a second perimeter delimiting a second area on the second side, the radiation detector comprising:
   a scintillator having a first side and a second side opposite to the first side, the first side of the scintillator being arranged at the first area of the radiation detector for receiving the receiving radiation, and
   a photosensor coupled at the second side of the scintillator or in contact with the second side of the scintillator for receiving a converted receiving radiation from the scintillator and attached at the first mentioned second side of the radiation detector to the supporting means, the moisture protection structure comprising:
   at least one moisture-resistant layer deposited on the first area and the lateral side of the radiation detector,
   a moisture-resistant cover arraneed to cover the at least one moisture-resistant layer at the first side, wherein:
   the moisture resistant cover and the at least one moisture-resistant layer are transparent for the radiation, and a pressurizing member attached to the supporting means and comprising an elastic deformable material, the pressurizing member being arranged for exerting a pressure on the moisture-resistant cover towards the second side for sealing the first side of the radiation detector against moisture penetration, characterized in that the pressurizing member, the elastic deformable material and the moisture-resistant cover are arranged for allowing a free movement of the moisture-resistant cover in a direction in parallel to the first area of the radiation detector.

2. The radiation detector as claimed in claim 1, wherein the at least one moisture-resistant layer extends from the lateral side to cover at least a peripheral area of the supporting means extending from the second perimeter of the radiation detector.

3. The radiation detector as claimed in claim 1, wherein the pressurizing member further comprises a further cover at the first side and being fixedly attached to the first mentioned supporting means and wherein the elastic deformable material is arranged between the further cover and the moisture-resistant cover, the elastic deformable material being in contact with the further cover and the moisture-resistant cover for exerting a farther pressure to the further cover.

4. The radiation detector as claimed in claim 3, wherein the further cover is transparent for the receiving radiation and completely covers the moisture-resistant cover for exerting a continuous and uniform pressure on the moisture-resistant cover and wherein the elastic deformable material is transparent for the receiving radiation.

5. The radiation detector as claimed in claim 1, wherein the pressurizing member further comprises at least one further supporting means arranged at least at a periphery of the moisture-resistant cover be attached or to be in contact with the moisture-resistant cover, the at least one further supporting means being further arranged to be attached to the first mentioned supporting means by means of the elastic deformable material.

6. The radiation detector as claimed in claim 5, wherein the further supporting means is transparent for the radiation and completely covers the moisture-resistant cover for exerting a continuous and uniform pressure on the moisture-resistant cover.

7. The radiation detector as claimed its claim 1, wherein the elastic deformable material comprises foam.

8. The radiation detector as claimed in claim 1, wherein the elastic deformable material comprises an array of flaps.

9. The radiation detector as claimed in claim 1, wherein the moisture; resistant cover is a moisture-resistant foil.

10. The radiation detector according to claim 9, wherein the moisture-resistant foil is a metal foil.

11. The radiation detector as claimed in claim 1, wherein the at least one moisture-resistant layer is also deposited on the second area of the radiation detector.

12. The radiation detector as claimed in claim 1, wherein at least a further moisture-resistant layer is deposited on top of the at least one moisture-resistant layer at the lateral side.

13. The radiation detector according to claim 12, wherein the at least a further moisture-resistant layer is deposited on top of the at least one moisture-resistant layer at the first side.

14. The radiation detector as claimed in claim 1, wherein the at least one moisture-resistant layer is one or a plurality of organic layers and the at least a further moisture-resistant layer is one or a plurality of pairs of inorganic-organic layers.

15. The radiation detector as claimed in claim 3, wherein a reflective layer is deposited on top of the at least one moisture-resistant layer or on top of the moisture-resistant cover or on top of the cover.

16. The radiation detector as claimed in claim 1, further comprising a substrate layer arranged on top of the scintillator at the first side of the radiation detector.

17. The radiation detector as claimed in claim 1, wherein the at least one moisture-resistant layer is deposited on the second side of the scintillator with which the scintillator is in contact with the photosensor.

18. The radiation detector as claimed in claim 1, further comprising an optical layer arranged between the photosensor and the scintillator.

19. The radiation detector as claimed in claim 1, wherein the scintillator is a columnar scintillator.

20. The radiation detector device as claimed in claim 1, wherein the radiation detector is a flat panel radiation detector.

21. A method of fabricating a flat panel radiation detector, the method comprising:
coating an optical layer with a scintillator layer to obtain a structure formed by the coated optical layer with the scintillator layer,
depositing at least one moisture-resistant layer on a first side of the scintillator layer and on a lateral side of the structure formed by the coated optical layer with the scintillator layer, a first area at the first side of the scintillator layer is arranged for receiving radiation to be detected,
depositing at least a further moisture-resistant layer on the at least one moisture resistant layer at the lateral side of the structure formed by the coated optical layer with the scintillator layer,
attaching the structure formed by the coated optical layer with the scintillator layer to a photosensor on a second side opposite to the first side, and
sealing the first side with a moisture-resistant cover by means of an elastic deformable material that exerts a pressure on the moisture-resistant cover, characterized in that the elastic deformable material and the moisture-resistant cover are arrange for allowing a free movement of the moisture-resistant cover in a direction in parallel to the first area.

22. The method of fabricating a flat panel radiation detector as claimed in claim 21, the method further comprising the step of depositing at least a further moisture-resistant layer on top of the at least one moisture resistant layer at he first side of the structure formed by the coated optical layer with the scintillator layer.

* * * * *